United States Patent
Ghiraldi

(10) Patent No.: US 8,146,624 B2
(45) Date of Patent: Apr. 3, 2012

(54) SYSTEM FOR CONTROLLING THE LOADING OF ONE OR MORE FOODS INTO A SELF-PROPELLED MIXING UNIT BY MEANS OF A MECHANICAL SHOVEL MOUNTED TO A MOTOR VEHICLE

(75) Inventor: Andrea Ghiraldi, Poggio Rusco (IT)

(73) Assignee: Dinamica Generale S.R.L., Poggio Rusco (IT)

( * ) Notice: Subject to any disclaimer, the term of this patent is extended or adjusted under 35 U.S.C. 154(b) by 945 days.

(21) Appl. No.: 12/166,030

(22) Filed: Jul. 1, 2008

(65) Prior Publication Data

US 2009/0020076 A1 Jan. 22, 2009

(30) Foreign Application Priority Data

Jul. 4, 2007 (IT) .................................. BO07A0461

(51) Int. Cl.
*B65B 1/30* (2006.01)

(52) U.S. Cl. ............ 141/83; 141/95; 141/108; 141/231; 356/326

(58) Field of Classification Search .................... 141/83, 141/94, 95, 108, 231; 356/402–408, 300, 356/326; 250/39.12, 39.123; 56/10.2 R; 99/342

See application file for complete search history.

(56) References Cited

U.S. PATENT DOCUMENTS

| 4,390,075 A * | 6/1983 | Snead ..................... 177/210 FP |
| 5,751,421 A * | 5/1998 | Wright et al. ................. 356/328 |
| 2011/0061762 A1 * | 3/2011 | Madsen et al. .................... 141/1 |

FOREIGN PATENT DOCUMENTS

| DE | 10 2004 024 168 | 10/2005 |
| EP | 1 577 663 | 9/2005 |
| WO | 96/14735 | 5/1996 |
| WO | 2005/067704 | 7/2005 |
| WO | 2006/035012 | 4/2006 |

* cited by examiner

Primary Examiner — Gregory Huson
Assistant Examiner — Jason Niesz
(74) Attorney, Agent, or Firm — Ladas & Parry LLP

(57) ABSTRACT

A system for controlling the loading of animal food into self-propelled mixing units by means of a mechanical shovel. The system includes a testing apparatus, which is mounted to the shovel to determine a series of chemical-physical information related to the chemical components contained in the food and a weighing apparatus, which is installed in a self-propelled unit to measure the weight of the food and is adapted to establish a wireless communication with the testing apparatus to receive the chemical-physical information related to the components contained in the food.

13 Claims, 2 Drawing Sheets

SYSTEM FOR CONTROLLING THE LOADING OF ONE OR MORE FOODS INTO A SELF-PROPELLED MIXING UNIT BY MEANS OF A MECHANICAL SHOVEL MOUNTED TO A MOTOR VEHICLE

TECHNICAL FIELD

The present invention relates to a system for controlling the loading of one or more foods into a self-propelled mixing unit of the foods by means of a mechanical shovel mounted to a motor vehicle.

BACKGROUND ART

As known, in the stockbreeding sector, the need to improve the animal's diet is increasing to achieve good health conditions of the animal, on one hand, and to ensure the quality and quantity of the products directly derived from the animals themselves, such as milk or other products derived therefrom, on the other.

At present, the diet of animals, e.g. of cattle, is prescribed by a specialist, typically a nutritionist, who on the basis of laboratory analysis identifies a series of information related to the nutritional values and to the chemical components which characterize each food prescribed in the animal's food diet.

Once the nutritional values and the chemical components present in each food, such as starch, proteins, dry substance, etc. have been identified, the nutritionist determines on the basis of the latter and of the physical and productive conditions of the animal, the correct food ration in terms of overall weight to be introduced in the corresponding diet.

It is further known that in many stockbreeding farms and establishments, each food dosing and the preparation of the food ration to be administered to each animal are performed by means of a mixer wagon in which the various foods are loaded by means of mechanical shovels on the basis of the corresponding weights in the diet preset by the nutritionist.

More specifically, last generation mixer wagons are provided with a weighing apparatus, which is adapted to detect, instant by instant, the weight of the food poured by the mechanical shovel into the mixing wagon, so as to indicate the reaching of the total preset weight of the food in the diet to the operators.

Unfortunately, before the aforesaid final collecting and loading operation into the mixing wagon, the foods which constitute the animals' diet may often be stored in areas or store-rooms subject to a prolonged exposure to atmospheric elements, such as rain, which as known considerably alter the nutritional values of foods.

Such an alteration indeed causes a change of the percentages of the chemical components in the foods which causes, the administered food weights being equal, a consequent variation of the diet actually administered to the animal with respect to the "theoretical" diet, i.e. the diet provided by the nutritionist on the basis of the previous laboratory tests, thus determining possible conditions of dietary imbalance in the animal and, consequently, a qualitative and quantitative deterioration of the products obtained from the animal itself.

Furthermore, a variation of the nutritional features of the diet, in terms of chemical components administrated by means of foods, may be extremely harmful on the animal, which in case of serious food imbalance may be subjected to a stress which may compromise the physical conditions thereof.

It is further appropriate to add that when an animal ingests a food having an excessive amount of proteins as compared to that provided in the diet, it transforms such an excess of proteins, by means of the digestive cycle, into nitrogenous compounds which are expelled by the animal in the form of faeces, thus causing a non-negligible impact from the environmental point of view each time the number of animals subjected to a diet having a protein excess is quite high.

DISCLOSURE OF THE INVENTION

It is thus the purpose of the present invention to make a system for controlling the loading of foods into a self-propelled unit by means of a mechanical shovel which allows to obtain a mixture of foods within the self-propelled mixing unit, the chemical features and the nutritional values of which actually correspond to the features and to the predetermined nutritional values in the preset diet, respectively.

According to the present invention a system for controlling the loading of foods into a self-propelled mixing unit is made, as described in claim 1 and preferably, but not necessarily, in anyone of the attached claims.

BRIEF DESCRIPTION OF THE DRAWINGS

The present invention will now be described with reference to the accompanying drawings, which show a non-limitative embodiment thereof, in which:

FIG. 1 diagrammatically shows a system for controlling the loading of foods into a self-propelled mixing unit by means of a mechanical shovel mounted to a motor vehicle constructed according to the dictates of the present invention; while

BEST MODE FOR CARRYING OUT THE INVENTION

Figure 1:
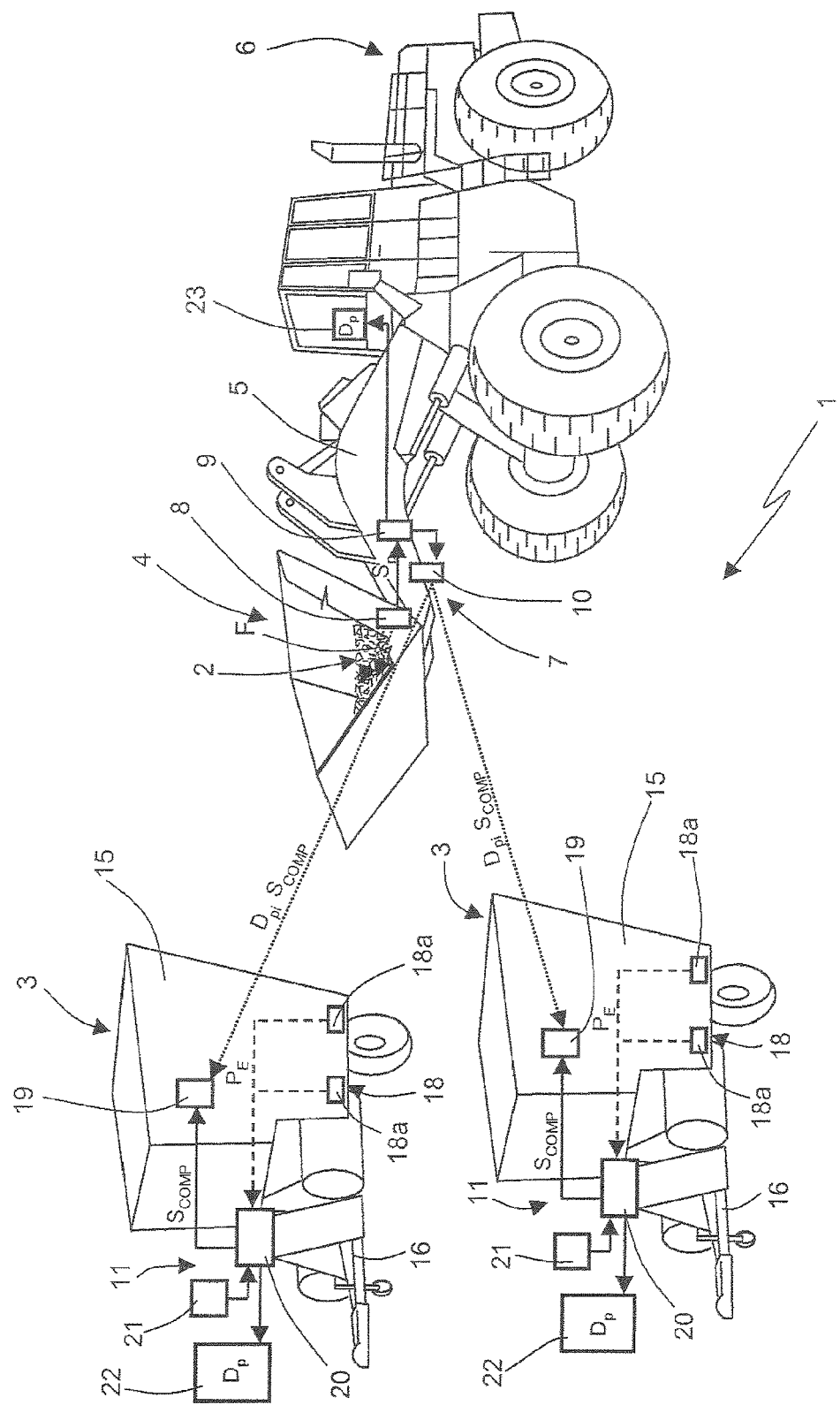

With reference to FIG. 1, numeral 1 indicates as a whole a system for controlling the loading of one or more foods 2 into one or more self-propelled food mixing units 3 by means of a bucket or mechanical shovel 4, which is supported by an articulated arm 5 mounted to a corresponding motor vehicle 6, e.g. a tractor.

System 1 essentially includes a food testing apparatus 7, which is installed on the motor vehicle 6 at the mechanical shovel 4, and is adapted to test the food 2 temporarily loaded into the mechanical shovel 4 to obtain a series of indications related to the chemical-physical features of the elements which characterize the food 2 itself on the basis of the performed test.

Specifically, the food testing apparatus 7 is adapted to determine the nutritional values, i.e. the chemical components contained in the tested element 2, by means of a spectrophotometric test. In detail, the food testing apparatus 7 is adapted to determine the percentage of each chemical component in the food 2 contained in the mechanical shovel 4, such as: the percentage of water, the percentage of dry substance (measurement complementary to the amount of water), the percentage of starch, the percentage of proteins, the percentage of nitrogen, the percentage of fibers, the percentage of soluble enzymes, the percentage of sodium, the percentage of magnesium, and the percentages of a series of other chemical elements or compounds which characterize the tested food.

Figure 2:
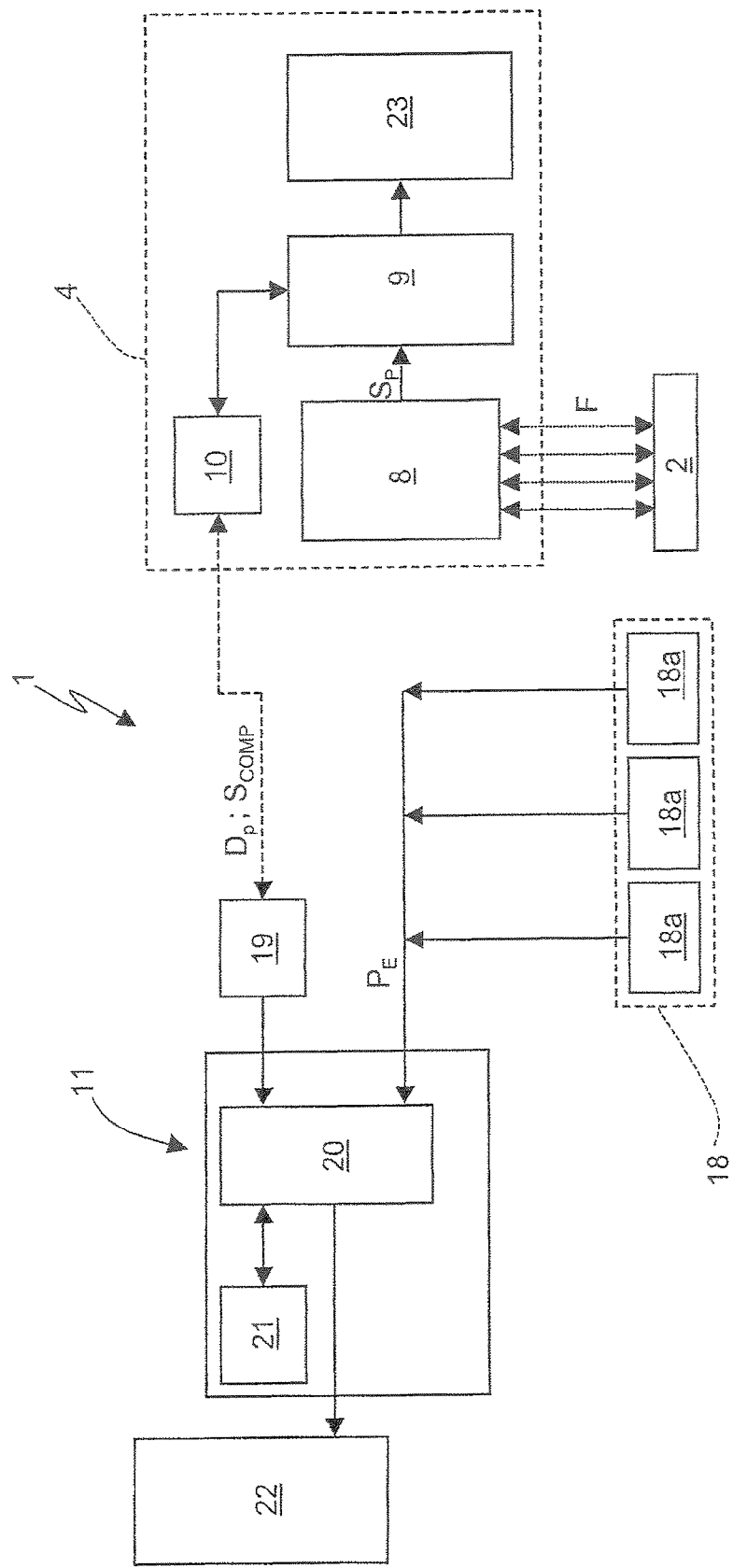
FIG. 2 shows an electronic block diagram of two apparatuses included in the system shown in FIG. 1.

With reference to the example shown in FIGS. 1 and 2, the testing apparatus 7 includes an optoelectronic device 8, which is adapted to be installed in the mechanical shovel 4 to emit a beam of electromagnetic radiations F towards the food 2 contained inside the mechanical shovel 4, and outputs a signal $S_P$ containing the spectrum of electromagnetic radiations reflected by the food 2.

The testing apparatus 7 further includes a processing unit 9 which processes the signal $S_P$ and determines the information related to the nutritional values of the food 2, i.e. the chemical components present in the food 2, on the basis of the reflected electromagnetic radiation spectrum.

Specifically, the processing unit 9 determines the content percentages $P_M$ in terms of weight of each chemical component present in the food 2 inside the shovel 4 on the basis of the electromagnetic radiation spectrum reflected by the food 2.

The testing apparatus 7 further includes a wireless-type communication module 10 by means of which the processing unit 9 transmits a signal $S_{COMP}$ containing the results of the performed test in relation to the nutritional values, i.e. to the chemical components present in the tested food and the corresponding content percentages $P_M$.

The optoelectronic device 8 and the processing unit 9 will not be further described, being preferably constructed according to the description of the European patent application EP1577663 filed by the same applicant, except for specifying that the processing unit 9 and the communication module 10 may be installed either in the shovel 4 near the optoelectronic device 8, or in the motor vehicle 6 near the operator.

Instead, as far as the self-propelled unit 3, it includes a mixer wagon or any other similar wagon and is comprised of: a body 15 into which foods are poured, a supporting frame 16 of the body 15 and preferably, but not necessarily, a mixer assembly (not shown) fitted within the body 15 to appropriately mix the food inside the body 15 itself.

Furthermore, the system 1 includes a weighing device 11, which is installed in the self-propelled unit 3, and is adapted to measure, instant by instant, the weight $P_E$ of the food 2 inside the self-propelled unit 3 itself.

Specifically, the weighing device 11 includes an electronic measuring device 18 including, for example, a series of loading cells 18a coupled in a known manner to the frame 16 and/or to the body 15 to measure, at each loading, the actual weight $P_E$ of the food contained in the body 15.

The weighing apparatus 11 further includes a wireless-type communication module 19, which is adapted to communicate with the communication module 10 of the testing apparatus 7 to receive the signal $S_{COMP}$ containing the percentages of the chemical components determined by testing the food 2; and a processing unit 20, which receives the inputted weight $P_E$ measured by the electronic measuring device 18 and the signal $S_{COMP}$ received from the communication module 19.

Specifically, at each loading, the processing unit 20 determines the weight of a remaining amount of food 2 which must still be loaded into the self-propelled unit 3 according to the chemical-physical information detected by the testing apparatus 7, so that each chemical-physical component of the food 2 in the self-propelled unit 3 fulfils a predetermined condition, once the loading has been finished.

In other words, upon each loading of food into the self-propelled unit 3 carried out by the shovel 4, the processing unit 20 determines the weight of the food which must still be loaded into the self-propelled unit 3 during the following loading operations on the basis of the chemical-physical information detected by the testing apparatus 7; such a weight is determined so that, at the end of the loading operations, each chemical-physical component of the food 2 in the self-propelled unit 3 fulfils a predetermined condition, described in detail hereinafter.

The weighing apparatus 11 further includes a memory module 21 which stores one or more predetermined recipes or diets, in which each diet includes the list of foods to be loaded into the self-propelled unit 3 to obtain the intended food composition, and a predetermined initial theoretical total weight $P_O$ for each food.

In detail, each predetermined recipe or diet contains, for each food, a series of theoretical target values of the chemical components contained in the food itself, wherein each theoretical target value is comprised of: a relative percentage $P_R$ indicating the relative weight of the chemical component in a given amount of food, and a target weight $P_{OC}$ indicating the total theoretical weight of the chemical component in an amount of food having a weight corresponding to the total theoretical weight $P_O$.

At each loading, the processing unit 20 is adapted to determine the actual weight $P_W$ of the chemical component contained in the self-propelled unit 3 according to the measured weight $P_E$ and to the content percentage $P_M$ of the chemical component detected by the testing apparatus 7.

Specifically, at each loading, the processing unit 20 detects the weight of the food added into the self-propelled unit 3 during the last loading, and on the basis of the latter and of the content percentage $P_M$ of the chemical component detected by the shovel 4 during the last loading, it calculates and updates the actual weight $P_W$ of the chemical component contained inside the self-propelled unit 3.

The processing unit 20 is further adapted to adjust the predetermined, theoretical total weight $P_O$ stored in the memory module 21, according to the deviation $\Delta S$ between the actual weight $P_W$ of the chemical component contained inside the self-propelled unit 3 and the initial target weight $P_{OC}$ provided in the predetermined diet.

In this case, the processing unit 20 either increases or decreases the value of the predetermined, theoretical total weight $P_O$ so that the deviation $\Delta S$ between the actual weight $P_W$ of the chemical component contained inside the self-propelled unit 3 and the initial target weight $P_{OC}$ provided in the predetermined diet is reduced to an essentially null value.

At the end of each loading performed by the mechanical shovel 4, the processing unit 20 is further adapted to determine the difference $D_P$ between the weight of the food contained in the body 15 measured by the weighing apparatus 11 and the modified total weight $P_O$, i.e. determined after the last loading. It is worth specifying that the difference $D_P$ corresponds to the weight of the remaining amount of food 2 which must still be loaded into the self-propelled unit 3 by the shovel 4, so that each chemical-physical component of the food 2 in the self-propelled unit 3 at the end of the loading fulfils the condition of nullification of the deviation $\Delta S$.

The apparatus 11 further includes an interface device 22 adapted to generate, at each loading, a message in a visual and/or voice format indicating the difference $D_P$ between the weight of the food contained in the body 15 measured by the weighing apparatus 11 and the total weight $P_O$ modified by the processing unit 20.

Specifically, in the example shown, the interface device 22 includes a display able to display a visual message and/or one or more speakers generating an audio message.

The apparatus 11 may further transmit the difference $D_P$ indicating the weight of the food to be loaded to the testing apparatus 7, which must in turn be provided with an interface device 23 similar to the interface device 22, which is installed on the motor vehicle 6, near the operator of the mechanical shovel 4, to communicate the difference $D_P$ related to the amount, in terms of weight, of the food which must still be loaded into the self-propelled unit 3, at each loading.

Specifically, the apparatus 11 generates a visual or voice message indicating the completion of the load when the processing unit 20 detects that the difference $D_P$ is null, i.e. when the weight of the food measured in the body 15 corresponds to the total weight $P_O$, appropriately modulated on the basis of the chemical component values. It is apparent that such a message may be generated by means of the interface device 22 and/or by means of the interface device 23.

At each new loading, each self-propelled unit 3 preferably, but not necessarily, transmits a loading request signal to the testing apparatus 7. If the shovel 4 is in a loading condition of a different self-propelled unit 3, the testing apparatus 7 transmits a signal indicating a condition of unavailable loading. In this case, the weighing apparatuses 11 of the self-propelled units 3 which have sent the loading request signal are taken to a standby condition, condition which ends upon the completion of the loading in progress.

When the loading of a self-propelled unit 3 is completed, the testing apparatus 7 may transmit a signal indicating the condition of completion of the loading and the availability for a new loading and waits for a new loading request signal by the weighing apparatuses 11 mounted to the self-propelled units 3.

Upon the reception of a first loading request signal, the testing apparatus 7 recognizes the self-propelled unit 3 associated to the weighing device 11 which has sent the request signal and, at the same time, returns to a temporary condition of unavailable loading for the other self-propelled units 3, condition which will end upon the completion of the loading of the newly selected self-propelled unit 3.

In this case, the testing apparatus 7 may be able to generate a voice and/or visual message by means of the interface device 23 indicating the self-propelled unit 3 to be loaded to the operator of the shovel 4.

The loading of foods in the self-propelled unit 3 is performed by the shovel 7 according to the list of foods provided in the preset recipe. In detail, the interface device 22 or 23 communicates the first food to be loaded and the total weight $P_O$ of the same to the operator.

Specifically, upon the selection of the diet, the processing unit 20 displays the food to be loaded, the total weight $P_0$ and the difference $D_P$ at the interface device 22 or 23.

When the shovel 4 collects a given amount of food for loading, the testing apparatus 7 generates the beam F on the loaded food and transmits the signal $S_{COMP}$ containing the content percentages $P_M$ of the chemical components present in the food 2 loaded in the shovel 4 to the weighing apparatus 11.

The weighing apparatus 11 detects the occurred loading by the shovel 4, e.g. by measuring the variation of weight, and adjusts the total weight $P_O$ according to the deviation $\Delta S$ between the actual weight $P_W$ of the chemical component contained inside the self-propelled 3 and the initial target weight $P_{OC}$ provided by the predetermined diet.

Specifically, the weighing apparatus 11 either properly increases or decreases the total weight $P_O$ of the food included in the diet, so as to nullify the deviation $\Delta S$ between the actual weight $P_W$ of the chemical component contained inside the self-propelled unit 3 and the initial target weight $P_{OC}$ provided by the predetermined diet.

Upon each update of the total weight $P_O$ the measuring apparatus 11 determines the difference $D_P$ between the weight $P_E$ of the loaded food and the newly calculated total weight $P_O$ and, at the same time, communicates the difference $D_P$ by means of the interface device 22 and/or 23 so as to advantageously allow the operator to adjust the amount of food to be loaded into the mechanical shovel 4.

When the difference $D_P$ is essentially null, the weighing apparatus 11 preferably, but not necessarily, transmits the signal indicating the completion of the food loading to the testing apparatus 7. Such information may be communicated to the operator by means of the interface device 23.

When the difference $D_P$ is essentially null, the weighing device 11 preferably, but not necessarily, determines a difference $D_T$ between the total weight $P_0$ obtained at the end of the loading upon the adjustments, and corresponding to the weight of the actually loaded food, and the initial, theoretical total weight $P_0$ included in the diet.

The difference $D_T$ may be communicated to the operator by means of the interface devices 22 or 23.

At this point, the weighing apparatus 11 may communicate by means of the interface device 22 and/or 23 the type of a further food to be loaded included in the diet, or if the loading of all the foods included in the diet itself has finished, is able to communicate the completion of the loading activity into the self-propelled unit 3. In this case, the testing apparatus 7 transmits the signal indicating the condition of availability for a new loading to the various self-propelled units 3, thus repeating the operations provided by the above described working.

The system 1 advantageously allows to test foods to be administered to the animals in real time, thus allowing to obtain a food composition inside the self-propelled unit which fully fulfils the nutritional features provided in the diet with obvious benefits with regards both to the animal's physical conditions and the quality and quantity of the products obtained therefrom.

Indeed, the system 1 is able to implement a smart self-adjustment of the total weight $P_O$ of each food contained in the food mixture loaded into the self-propelled unit 3, thus advantageously ensuring that the percentage of chemical substances or components present in the food itself, and thus in the total mixture, fulfill the nutritional requirements provided in the preset diet for the animal.

Furthermore, the food administered to the animal contains a protein value corresponding to that actually provided in the diet; such a condition determines evident benefits for the animal, which beyond having a correct contribution of proteins is not subjected to an increase of the amount of nitrogenous compounds expelled through its faeces, with obvious advantages from the environmental point of view.

It is finally apparent that changes and variations may be made to the system 1 described and illustrated herein, without departing from the scope of the present invention as claimed in the appended claims.

The invention claimed is:

1. A system (1) for controlling the loading of at least one food (2) into one or more self-propelled units (3) by means of a mechanical shovel (4), which is mounted to a motor vehicle (6) and is adapted to collect and load said food (2) into a self-propelled unit (3); said system (1) being characterized in that it includes:
   a testing apparatus (7), which is mounted to said mechanical shovel (4) to determine a series of chemical-physical information related to the chemical components contained in the food (2) present in the shovel (4) during each loading;
   weighing means (11), which is installed in a self-propelled unit (3) to measure the weight ($P_E$) of the food (2) contained in said self-propelled unit (3);

wireless communication means (10)(19) through which said testing apparatus (7) communicates said chemical-physical information related to the components contained in said food (2) to said weighing apparatus (11); and wherein said weighing means (11) includes a processing means (20), which is adapted to determine, at each loading and according to said chemical-physical information detected by said testing apparatus (7), the weight ($D_P$) of a remaining amount of food (2) to be loaded into said self-propelled unit (3), so that each chemical-physical component of the food (2) in the self-propelled unit (3) at the end of the loading fulfils a predetermined condition.

2. A system according to claim 1, wherein said weighing apparatus (11) includes a memory means (21) containing one or more predetermined diets, wherein each diet includes a list of the foods to be loaded into the self-propelled unit (3) to obtain the intended food composition; for each food (2), each diet including a predetermined, theoretical total weight ($P_O$) and a predetermined target weight ($P_{OC}$) of each chemical component present in said food (2).

3. A system according to claim 2, wherein said testing apparatus (7) is adapted to determine the content percentage ($P_M$) of each chemical component inside said food (2) present in said shovel (4); said processing means (20) is adapted to determine the actual weight ($P_W$) of each chemical component contained inside said self-propelled unit (3) according to the measured weight ($P_E$) and the content percentage ($P_M$) of the chemical component detected by said testing apparatus (7).

4. A system according to claim 2, wherein said processing means (20) is adapted to adjust the predetermined, theoretical total weight ($P_O$) stored in said memory means (21) according to said deviation ($\Delta S$) between the actual weight ($P_W$) of the chemical component contained in the food inside the self-propelled unit (3) and said theoretical target weight ($P_{OC}$) of said chemical component included in said predetermined diet.

5. A system according to claim 4, wherein said processing means (20) is adapted to adjust the value of said predetermined, theoretical total weight ($P_O$) so that said deviation ($\Delta S$) between the actual weight ($P_W$) of the chemical component contained inside the self-propelled unit (3) and said theoretical target weight ($P_{OC}$) provided by the predetermined diet is reduced to an essentially null value.

6. A system according to claim 4, wherein said processing means (20) is adapted to determine a difference ($D_P$) between the weight ($P_E$) of the food (2) contained in said self-propelled unit (3) measured by the weighing apparatus (11) and the total weight ($P_O$) adjusted by the processing module (20).

7. A system according to claim 6, wherein said processing means (20) is adapted to determine a difference ($D_T$) between the theoretical total weight ($P_0$) included in said predetermined diet and the total weight ($P_0$) obtained at the end of the loading, upon the adjustments and corresponding to the weight of the food actually loaded into the self-propelled unit (3).

8. A system according to claim 6, including interface means (22) (23) adapted to generate a message in a visual and/or voice format indicating said difference ($D_P$) between the weight ($P_E$) of the food measured by the weighing apparatus (11) and the total weight ($P_O$) adjusted by the processing module (20) at each loading carried out by said shovel (4) into the self-propelled unit (3).

9. A system according to claim 8, wherein said interface means (22) (23) are installed in said motor vehicle (6) and/or in said self-propelled unit (3).

10. A system according to claim 1, wherein each weighing apparatus (11) of different self-propelled units (3) transmits a first loading request signal to the testing apparatus (7) at each new loading.

11. A system according to claim 10, wherein upon the reception of said first loading request signal, the testing apparatus (7) recognizes a self-propelled unit (3) associated to the weighing apparatus (11) which sent the loading request signal and, at the same time, returns to a temporary condition of unavailable loading with regards to the remaining self-propelled units (3).

12. A system according to claim 1, wherein said testing apparatus (7) includes optoelectronic means (8), which are installed in said shovel (4) to emit an electromagnetic radiation beam (F) towards the food (2) contained inside the mechanical shovel (4) and output a first signal ($S_P$) containing the electromagnetic radiation spectrum reflected by the food (2) contained in the shovel (4) itself.

13. A system according to claim 12, wherein said testing apparatus (7) includes a processing unit (9) which processes said first signal ($S_P$) and determines the chemical components present in the food (2), on the basis of the reflected electromagnetic radiation spectrum.

* * * * *